3,497,369
ZEIN-CONTAINING PLASTIC COMPOSITION
Doris N. Martin, Indianapolis, Ind., assignor to Corn Products Company, a corporation of Delaware
No Drawing. Filed July 17, 1968, Ser. No. 745,407
Int. Cl. C08h 1/00
U.S. Cl. 106—153                                  14 Claims

ABSTRACT OF THE DISCLOSURE

The present invention covers a novel product containing zein which is substantially dry and which upon the addition of warm water, forms a pliable plastic composition which may be pulled like taffy, molded, worked with as modeling clay, etc. The composition consists of zein and a small portion of a plasticizer such as glyceryl monoricinoleate. An inert white pigment may be added to whiten the zein composition thus enhancing the brightness of dye colors subsequently applied. The quantity of plasticizer blended with the zein is important. Too small a quantity of plasticizer makes the product brittle so that upon hardening, it is very fragile. Too large a quantity of plasticizer prevents or delays hardening of the plastic composition. About 5 parts of plasticizer for every 75 parts of zein is most preferred.

Use for the composition of the present invention may be found in arts and crafts, hobbies, household products, industrial products, and many other areas.

---

The present invention relates to a substantially dry powdery zein-containing composition and the process for the preparation thereof.

Zein is a valuable industrial protein, obtainable only as a product of corn processing. It is produced commercially by extracting gluten meal with isopropyl alcohol, followed by clarification, oil removal, precipitation with water, and drying. Zein is one of the most inert proteins and has a complex chemical structure. It is a naturally occurring high polymer made up of a number of amino acids bound by peptide linkages. The molecular weight has been estimated to be approximately 40,000. On a dry basis, the commercial product has a protein content of 98 to 99% and contains fractional amounts of oil and ash. Zein is available in either powdered or granular form and either form is equally suitable. Zein is practically odorless and has a light yellow color. In dry form, it can be kept indefinitely under normal storage conditions without noticeable changes in properties.

Zein has been used in the past in many general applications. From solvent solutions zein forms tough, high gloss films resistant to scuffing and grease. It may be used in the preparation of varnishes, both clear and pigmented, for decorative and protective coatings on wood, paper, and pulp products, leather, cloth, and glass. Solutions of zein in certain glycols provide excellent binders for cork products. In the manufacture of phonograph records, zein has been used to improve wear resistance and enhance tone quality. Although it has been known that zeinc an be readily solubilized or dispersed with soaps or synthetic detergents in aqueous media for applications where water solutions are desired, it was not realized until the discovery of the present invention that zein could provide such a fascinating plastic type composition, with a simulated leather appearance.

It is an object of the present invention to provide a substantially dry powdery composition containing zein which when mixed with warm water yields a product of infinite flexibility and plasticity.

It is another object of the present invention to provide a process for preparing a flexible plastic composition from zein, which zein composition becomes rigid and possesses excellent strength when allowed to dry and harden.

Another object of the present invention is to provide a plastic zein composition which when dyed provides an attractive decorative object.

It is another object of the present invention to provide a moldable plastic composition which upon drying provides a hard, strong, rigid composition.

Other objects and advantages of the present invention will be apparent hereinafter from the specification and from the appended claims.

The present invention provides a substantially dry powdery zein-containing composition comprising a blend of zein and a plasticizer in proportion, such that for about 75 parts of zein from about 3 parts to about 6 parts of a plasticizer are present and preferably about 4 parts to about 5.5 parts of plasticizer are present. A typical formulation involves 5 parts of plasticizer per 75 parts of zein. In addition, an inert white pigment may be added, also in an amount from about 3 parts to about 6 parts.

The present invention also provides a process for preparing the zein-containing composition. The process comprises blending the zein with the plasticizer and, if desired, the inert white pigment, so as to provide an homogenous mixture of low moisture content, i.e., less than 10%. Although slightly higher moisture contents can be tolerated, the most desirable product is a powdery, free-flowing product for ease in handling, shipping and storing. Furthermore, too much moisture would cause preliminary plasticizing and hardening.

The invention further provides for a process and the resulting product for forming a plastic composition by (1) admixing substantially dry zein and a plasticizer in the proportions set forth above; and (2) adding warm water and mixing to a homogenous mixture. Optionally, an inert white pigment may be included in the first step.

The plasticizer is thoroughly admixed with the zein powder prior to contact with the warm water so that the plastic composition is uniformly pliable and moldable.

The plasticizer is preferably a fatty acid monoester and most preferably glyceryl monoricinoleate. Other plasticizers which may be used include glyceryl monostearate, carbowax, carbowax in combination with polyethylene glycol, acetylated monoglycerides, and the like.

The inert white pigment is preferably titanium dioxide, zinc oxide or barium sulfate, and the like.

The relationship of the quantity of constituents is important. It is necessary for each 75 parts of zein to provide from about 3 parts to about 6 parts of the plasticizer. Too small a quantity of plasticizer makes the product brittle upon hardening. Too large a quantity of plasticizer prevents or delays hardening of the plastic composition.

The addition of the inert white pigment is optional. If the white pigment is added, it is preferred that it be added in a quantity from about 3 parts to about 6 parts for each 75 parts of zein. It is also desirable that the total moisture content of all constituents be sufficiently low that the final blend is a free flowing substantially dry composition containing less than about 10% moisture.

When forming a plastic composition by the addition of warm water to the blend of zein and plasticizer, it has been found preferable to add water in an amount from about 45 parts to about 75 parts, most preferably, about 60 parts and that the water have a temperature from about 140° F. to about 212° F., most preferably from about 140° F. to about 180° F. The temperature of the plastic composition is generally from about 100° F. to about 175° F.

Warm water is required to provide the plastic flexible state. While working with or molding the plastic composition, periodic immersion in warm water preserves and continues the flexible state as long as is desired. Cooling commences and accelerates hardening. Once the product is hardened to a crumbly state, plasticity cannot be reinstated.

In a typical example of the present invention, 75 parts of zein are blended with 5 parts of glyceryl monoricinoleate and 5 parts of titanium dioxide. The resulting blend is a homogenous, free-flowing substantially dry particulate composition. The composition is packaged in flexible plastic bags in quantities of approximately 40 grams. When used, the bag is opened to permit the addition of 30 ml. of hot tap water at approximately 160° F. The water is blended with the dry zein composition by kneading the plastic bag. Within a matter of 2 or 3 minutes, the contents of the bag have formed a plastic composition which upon removal from the bag may be pulled like taffy, molded, worked as modeling clay and the like. The composition is maintained in a plastic condition by periodic immersion of the composition in warm water. Thus, as much time as is desired may be taken in molding the composition into the preferred form.

After molding the composition into the desired form, the molded form is permitted to dry by standing in atmospheric conditions. Upon drying, a rigid solid is formed having a leather-like appearance, which upon immersion in water does not become pliable nor dissolve. It may thus be seen that the composition has many uses particularly in the arts and crafts field as well as in hobbies, household products, industrial products and other areas.

The molded composition after drying is dyed with a water compatible dye; other decorations may be added by painting the molded object with oil or water paints or by affixing other objects through use of conventional adhesives to the object's surface.

The following examples illustrate the practice of the invention. All percentages are by weight and all temperatrues in degrees Fahrenheit unless otherwise specified.

EXAMPLE I

Zein, in the amount of 37.5 grams, was mixed with 2.5 grams of glyceryl monoricinoleate and 2.5 grams of titanium dioxide. This composition was placed in a polyethylene bag and subsequently 30 milliliters of hot tap water were added. The bag was kneaded for 2 to 3 minutes after which the zein composition was easily removed in one large lump of plastic consistency.

The product was molded into several types of jewelry forms and permitted to dry overnight. The next day the jewelry pieces having a leather-like appearance, were observed to be solid and firm, as well as noncracking and resistant to heat and water.

Several pieces of the jewelry were immersed in a water-soluble dye composition for 5 hours. After removal from the dye composition, the jewelry pieces were again permitted to dry and exhibited bright uniform colors.

EXAMPLE II

Zein, in the amount of 37.5 grams, was blended with 2.5 grams of polyethylene glycol (400) monostearate and 2.5 grams of titanium dioxide. As in Example I, this blend was admixed with 30 milliliters of hot tap water. Although the product did not quite exhibit the fine plastic characteristics of the product of Example I, it was satisfactory and could be molded.

EXAMPLE III

Zein, in the same proportion as in Examples I and II, was admixed with 2.5 grams of titanium dioxide and 2.5 grams of an acetylated monoglyceride, along with 4 milliliters of polyethylene glycol (400) and 4 milliliters of propylene glycol. To the resulting blend were added 30 milliliters of hot tap water. The product was kneaded as before and resulted in a plastic composition of great flexibility. After molding, it was found that the composition was somewhat flexible and required a longer drying time. Although the product was satisfactory, it was not of the superior quality of Example I.

EXAMPLE IV

This example demonstrates the range of plasticizer in proportion to the zein to achieve an acceptable product. In each case 37.5 grams of zein were used along with a portion of plasticizer as set forth in Table I below.

TABLE I

| | Zein, grams | Glyceryl monoricin- oleate, grams | Titanium dioxide, grams | Water, ml. | Product description |
|---|---|---|---|---|---|
| A | 37.5 | 1.5 | 2.5 | 30 | Moldable, slightly crumbly, sets-up very fast, 7-10 min. |
| B | 37.5 | 2.0 | 2.5 | 30 | Plastic, moldable, sets-up fast, 10-15 min. |
| C | 37.5 | 2.5 | 2.5 | 30 | Plastic, moldable, set-up time optional 15-25 min. |
| D | 37.5 | 3.0 | 2.5 | 30 | Plastic, moldable, set-up time satisfactory, 15-30 min. |
| E | 37.5 | 2.5 | 2.5 | 22 | Moldable, slightly crumbly, sets-up fast, 10 min. |
| F | 37.5 | 2.5 | 2.5 | 37 | Moldable, plastic, excess water easily squeezed out, sets-up 15-30 min. |

In each case the water added was at a temperature of about 160° F.

In use of the product of the present invention any type of paint or dye may be applied for decorative purposes. Application of two or more separate jewelry parts, such as necessary to constitute a necklace clasp or an earring fixture, may be accomplished using conventional adhesives. The resistance of the product to stress and strain and breakage even when in a thin sheet is indeed remarkable.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:
1. A composition in the form of a substantially dry, free-flowing powder, which upon admixture with less than 50% by weight thereof of warm water forms a flexible, pliable mass, which composition comprises a blend of about 75 parts by weight of zein and from about 3 parts to about 6 parts by weight of a substance selected from the group consisting of glyceryl monoricinoleate, glyceryl monostearate, an acetylated monoglyceride, and polyethylene glycol.

2. A composition as in claim 1 wherein the said substance is present in an amount from about 4 parts to about 5.5 parts by weight.

3. A composition as in claim 1 whrein the substance is glyceryl monoricinoleate.

4. A composition as in claim 1 including from about 3 parts to about 6 parts by weight of an inert white pigment selected from the group consisting of titanium dioxide, barium sulfate, and zinc oxide.

5. A composition as in claim 4 wherein the substance is glyceryl monoricinoleate and the inert white pigment is titanium dioxide.

6. A composition in the form of a substantially dry, free-flowing powder, which upon admixture with less than 50% by weight thereof of warm water forms a flexible, pliable mass, which composition comprises a blend of about 75 parts by weight of zein, about 5 parts by weight of glyceryl monoricinoleate, and about 5 parts by weight of titanium dioxide.

7. A flexible, pliable composition comprising an intimate admixture of a blend of about 75 parts by weight of zein, and from about 3 parts to about 6 parts by weight of a substance selected from the group consisting of glyceryl monoricinoleate, glyceryl monostearate, an acetylated monoglyceride, polyethylene glycol, with from about 45 parts to about 75 parts by weight of water, the temperature of the composition being from about 100° F. to about 175° F.

8. A shaped article formed from the flexible, pliable composition of claim 7.

9. The composition of claim 7 wherein the substance is glyceryl monoricinoleate.

10. A process for preparing a flexible, pliable mass useful for preparing a molded object, which becomes rigid upon drying, comprising:
(1) admixing about 75 parts by weight of zein and from about 3 parts to about 6 parts by weight of a substance selected from the group consisting of glyceryl monoricinoleate, glyceryl monosterate, an acetylated monoglyceride, and polyethylene glycol,
(2) adding from about 45 parts to about 75 parts by weight of warm water and
(3) mixing the resulting mixture to obtain the flexible, pliable plastic-like composition.

11. A process as in claim 10 wherein the temperature of the water is from about 140° F. to about 180° F.

12. A process as in claim 10 wherein the water is present in an amount of about 60 parts by weight.

13. A process as in claim 10 including the incorporation in the blend of from about 3 parts to about 6 parts by weight of an inert white pigment selected from the group consisting of titanium dioxide, barium sulfate, and zinc oxide.

14. A process as in claim 13 wherein the substance is glyceryl monoricinoleate and the inert white pigment is titanium dioxide.

References Cited
UNITED STATES PATENTS

| | | | |
|---|---|---|---|
| 2,115,716 | 3/1938 | Hansen | 106—153 |
| 2,243,644 | 5/1941 | Myers | 106—153 |
| 2,316,146 | 4/1943 | Adams | 106—147 |
| 3,323,922 | 6/1967 | Durst | 106—147 X |

JULIUS FROME, Primary Examiner

T. MORRIS, Assistant Examiner